(12) United States Patent
Yang et al.

(10) Patent No.: US 9,031,003 B2
(45) Date of Patent: May 12, 2015

(54) TERMINAL, THE TRANSMISSION POWER OF WHICH IS LIMITED IN ACCORDANCE WITH AN ADJACENT CHANNEL INTERFERENCE RATIO

(75) Inventors: Yoonoh Yang, Anyang-si (KR); Suhwan Lim, Anyang-si (KR); Manyoung Jung, Anyang-si (KR); Sangwook Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 206 days.

(21) Appl. No.: 13/807,580

(22) PCT Filed: Jun. 29, 2011

(86) PCT No.: PCT/KR2011/004751
§ 371 (c)(1),
(2), (4) Date: Dec. 28, 2012

(87) PCT Pub. No.: WO2012/002728
PCT Pub. Date: Jan. 5, 2012

(65) Prior Publication Data
US 2013/0100891 A1    Apr. 25, 2013

Related U.S. Application Data

(60) Provisional application No. 61/359,351, filed on Jun. 29, 2010.

(51) Int. Cl.
*H04W 52/02* (2009.01)
*H04B 15/00* (2006.01)
(Continued)

(52) U.S. Cl.
CPC ............. *H04B 15/00* (2013.01); *H04W 52/04* (2013.01); *H04J 11/0023* (2013.01)

(58) Field of Classification Search
CPC ... H04W 72/082; H04W 16/10; H04W 52/44; H04W 52/50; H04W 72/02; H04W 72/0453; H04L 5/0053; H04L 27/2666; H04L 5/0007; H04L 5/001; H04L 5/0039; H04L 5/0062
USPC .......................... 370/329, 328, 319, 344, 480
See application file for complete search history.

(56) References Cited

U.S. PATENT DOCUMENTS

2003/0087622 A1   5/2003   Jayaraman et al.
2007/0287465 A1   12/2007  Hyon et al.
(Continued)

FOREIGN PATENT DOCUMENTS

KR   10-2005-0056927 A   6/2005
KR   10-2007-0098285 A   10/2007
KR   10-2009-0113987 A   11/2009

OTHER PUBLICATIONS

Evolved Universal Terrestrial Radio Access (E-UTRA); Radio Frequency RF system scenarios. (3GPP TR 36.942 Version 8.2.0 Release 8). Publised on Jul. 2009.*

*Primary Examiner* — Dang Ton
*Assistant Examiner* — Sai Aung
(74) *Attorney, Agent, or Firm* — Birch, Stewart, Kolasch & Birch, LLP

(57) ABSTRACT

The present description relates to a terminal. The terminal comprises: a transceiving unit; and a control unit which controls the transceiving unit. When transmitting a signal in an uplink band that is spaced apart by a predetermined band so as to avoid continuity with the uplink band used by a terminal in an adjacent cell, the transceiving unit has an adjacent channel interference ratio, the value of which can be limited to a preset value in accordance with an offset relative to a predetermined band.

5 Claims, 11 Drawing Sheets

(51) Int. Cl.
*H04W 52/04* (2009.01)
*H04J 11/00* (2006.01)

(56) References Cited

U.S. PATENT DOCUMENTS

| | | | |
|---|---|---|---|
| 2010/0002675 A1* | 1/2010 | Fu et al. | 370/343 |
| 2010/0109778 A1* | 5/2010 | Ichitsubo et al. | 330/285 |
| 2010/0113050 A1* | 5/2010 | Cheng et al. | 455/450 |
| 2010/0189190 A1* | 7/2010 | Youtz et al. | 375/285 |
| 2011/0170496 A1* | 7/2011 | Fong et al. | 370/329 |
| 2011/0188427 A1* | 8/2011 | Ishii | 370/311 |
| 2011/0312328 A1* | 12/2011 | Choi et al. | 455/450 |
| 2012/0149413 A1* | 6/2012 | Pedersen | 455/501 |

* cited by examiner

FIG. 7
(a) 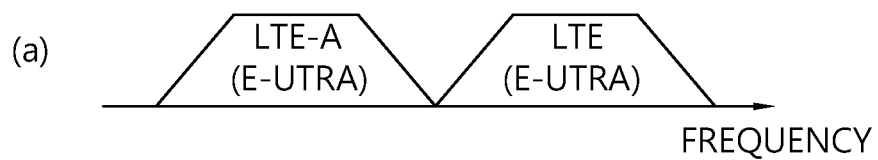
(b) 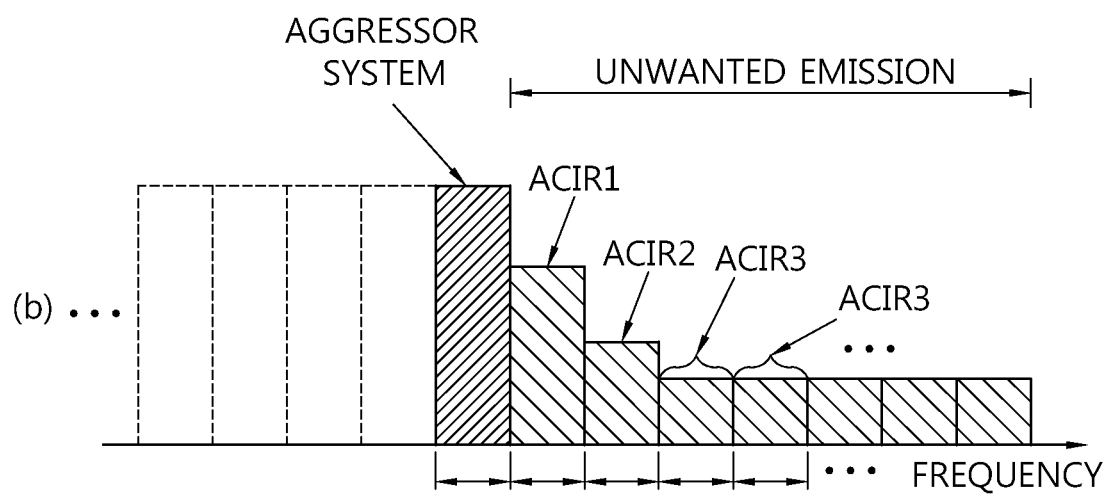

TERMINAL, THE TRANSMISSION POWER OF WHICH IS LIMITED IN ACCORDANCE WITH AN ADJACENT CHANNEL INTERFERENCE RATIO

CROSS REFERENCE TO RELATED APPLICATIONS

This application is the National Phase of PCT/KR2011/004751 filed on Jun. 29, 2011, which claims priority under 35 U.S.C. 119(e) to U.S. Provisional Application No. 61/359,351 filed on Jun. 29, 2010, all of which are hereby expressly incorporated by reference into the present application.

TECHNICAL FIELD

The present invention relates to a terminal having transmission power limited by an adjacent channel interference ratio.

BACKGROUND ART

In $3^{rd}$ generation mobile communication, not only voice, but also video and data can be transmitted and received. The $3^{rd}$ mobile communication is required to have a higher bandwidth because data traffic suddenly increases.

A task for constructing a network evolved to have a network having a higher bandwidth as described above (Long-Term Evolution Network: LTE) is in progress.

In the LTE, terms: an Evolved-UMTS (E-UMTS) and an Evolved-UTRAN (E-UTRAN) are used. In the E-UTRAN, Orthogonal Frequency Division Multiple Access (OFDMA) is used as Radio Access Technology (RAT).

FIG. 1 shows a wireless communication system.

The wireless communication system 10 includes one or more Base Stations (BSs) 11. The BS 11 commonly refers to a fixed station that communicates with User Equipments (UEs) 12, and it may also be called another terminology, such as an evolved-NodeB (eNB), a Base Transceiver System (BTS), or an access point. The BSs 11 provide communication services to respective geographical areas (commonly called cells) 15a, 15b, and 15c. The cell may be divided into a plurality of areas (called sectors). The UE 12 may be fixed or mobile and may also be called another terminology, such as a Mobile Station (MS), a Mobile Terminal (MT), a User Terminal (UT), a Subscriber Station (SS), a wireless device, a Personal Digital Assistant (PDA), a wireless modem, or a handheld device.

Downlink refers to communication from a BS to UE, and uplink refers to communication from UE to a BS. In downlink, a transmitter may be part of a BS, and a receiver may be part of UE. In uplink, a transmitter may be part of UE, and a receiver may be part of a BS.

LTE Physical Structure $3^{rd}$ Generation Project Partnership (3GPP) Long Term Evolution (LTE) supports a radio frame structure of a type 1 which is applicable to Frequency Division Duplex (FDD) and a radio frame structure of a type 2 which is applicable to Time Division Duplex (TDD).

In a cellular OFDM wireless packet communication system, uplink/downlink data packet transmission is performed per subframe, and one subframe is defined as specific time duration including a number of Orthogonal Frequency Division Multiplexing (OFDM) symbols.

3GPP supports a type 1 radio frame structure applicable to Frequency Division Duplex (FDD) and a type 2 radio frame structure applicable to Time Division Duplex (TDD).

FIG. 2 shows the type 1 radio frame structure. The type 1 radio frame consists of 10 subframes, and one subframe consists of two slots.

FIG. 3 shows the type 2 radio frame structure. The type 2 radio frame consists of two half frames, and each of the two half frames includes 5 subframes, a Downlink Pilot Time Slot (DwPTS), a Gap Period (GP), and an Uplink Pilot Time Slot (UpPTS). From among them, one subframe includes two slots. The DwPTS is used for initial cell search, synchronization, or channel estimation in UE. The UpPTS is used for channel estimation in a BS and for the uplink transmission synchronization of UE. The GP is a period where interference occurring in uplink due to the multi-path delay of a downlink signal between uplink and downlink is removed. That is, one subframe consists of two slots irrespective of the type of radio frame.

FIG. 4 shows the slot structure of LTE downlink.

As shown in FIG. 4, a signal transmitted in each slot may be described by a resource grid that includes $N_{RB}^{DL} N_{sc}^{RB}$ subcarriers and $N_{symb}^{DL}$ Orthogonal Frequency Division Multiplexing (OFDM) symbols. Here, $N_{RB}^{DL}$ indicates the number of Resource Blocks (RBs) in downlink, $N_{sc}^{RB}$ indicates the number of subcarriers that forms one RB, and $N_{symb}^{DL}$ indicates the number of OFDM symbols in one downlink slot.

FIG. 5 shows the slot structure of LTE uplink.

As shown in FIG. 5, a signal transmitted in each slot may be described by a resource grid that includes $N_{RB}^{DL} N_{sc}^{RB}$ subcarriers and $N_{symb}^{DL}$ OFDM symbols. Here, $N_{RB}^{DL}$ indicates the number of RBs in uplink, $N_{sc}^{RB}$ indicates the number of subcarriers that form one RB, and $N_{symb}^{DL}$ indicates the number of OFDM symbols in one downlink slot.

A resource element is a resource unit that is defined by an index (k, l) within an uplink slot and a downlink slot, and it indicates one subcarrier and one OFDM symbol. Here, k is an index on a frequency axis, and l is an index on a time axis.

LTE-Advanced

Meanwhile, there is a discussion on the development of a system which has been more advanced from LTE and is capable of providing a higher speed transmission/reception speed. In particular, the standardization task of International Mobile Telecommunication (IMT)-Advanced, that is, the next-generation mobile communication system, is in progress. An object of IMT-Advanced is to support multimedia service based on the Internet ProtoCol (IP) at a date rate of 1 Gbps in the stop and low-speed moving states and 500 Mbps in the high-speed moving state.

$3^{rd}$ Generation Partnership Project (3GPP) is a system standard which satisfies the requirements of IMT-Advanced and is preparing for LTE-Advanced (LTE-A) which is improved from Long Term Evolution (LTE) and is based on Orthogonal Frequency Division Multiple Access (OFDMA)/Single Carrier-Frequency Division Multiple Access (SC-FDMA) transmission methods. LTE-Advanced is one of powerful candidates for IMT-Advanced.

As described above, for higher data transmission and reception service, it is necessary to use a specific frequency band having an advantageous propagation characteristic. However, the development of new service and radio technology that use frequency bands is limited because the frequency bands are preoccupied by the existing radio service systems.

Accordingly, an LTE-Advanced (or also called LTE-A) system attempts to share the frequency bands with an LTE system. If the LTE-Advanced system shares the frequency bands with the LTE system, interference may occur between the LTE-Advanced system and the LTE system.

FIG. 6 is a diagram showing an example in which interference between systems occurs.

As can be seen from FIG. 6(a), the operating frequency bands of an LTE system and an LTE-A system may be disposed so that they are adjacent to each other.

As can be seen from FIG. 6(b), if an LTE-A system 15a sends a signal in this state, an adjacent LTE system 15b is subject to interference. Here, a system that gives the interference as described above is called an aggressor system (or a primary system), and a system that is subject to the interference is called a victim system (or a secondary system). Furthermore, UE in an aggressor system is called aggressor UE (or primary UE), and UE in a victim system is called victim UE (or secondary UE).

Here, a signal transmitted by the aggressor UE functions as interference to victim UE. A link between a BS and victim UE in the victim system is subject to interference, and this link is called a victim link.

DISCLOSURE

Technical Problem

Accordingly, an object of the present invention is to suppress interference between systems. In other words, an object of the present invention is to suppress inter-cell interference.

That is, an object of the present invention is to limit the uplink transmission power of UE in order to reduce interference in the uplink of an adjacent cell.

Technical Solution

To achieve the above objects, there is provided UE.

The UE may include a transceiver unit and a control unit controlling the transceiver unit.

When the transceiver unit sends a signal to a base station in an uplink band spaced apart from an uplink band used by UE within an adjacent cell by a specific band so that the uplink band of the transceiver unit is not contiguous to the uplink band used by the UE within the adjacent cell, the value of an Adjacent Channel Interference Ratio (ACIR) of the transceiver unit is limited to a value in a table below according to an offset with the specific band.

| Frequency offset from the specific band | ACIR value (LTE-A) |
| --- | --- |
| 0 RB | 32 + X (X = ..., −10, −5, 0, . 5, 10, ... dB) |
| 16 RBs | 43 + X (X = ..., −10, −5, 0, . 5, 10, ... dB) |
| 32 RBs or more | 43 + X (X = ..., −10, −5, 0, . 5, 10, ... dB) |

The UE may be an LTE-A UE or E-UTRA UE, and the UE within the adjacent cell may be an LTE UE, an LTE-A UE, or a UTRA UE.

The specific band may be a guard band.
The specific band may be 1 MHz.
The uplink band on which the signal is transmitted may be a band within 777 MHz to 787 MHz, and the uplink band used by the UE within the adjacent cell may be a band within 788 MHz to 798 MHz.

The values of the table are calculated by an equation below, $$ACIR_{new,k} = 10 \cdot \log_{10}\left(10^{-ACIR_k/10} \cdot \frac{BW_{16RB} - BW_{guard}}{BW_{16RB}} + 10^{-ACIR_{k+1}/10} \cdot \frac{BW_{guard}}{BW_{16RB}}\right)$$

Here, the k may be a constant indicating a $k^{th}$ ACLR value, the $BW_{16RB}$ may be a bandwidth corresponding to 16 resource blocks, and the $BW_{guard}$ may be a bandwidth of a guard band.

In order to achieve the above objects, this specification further provides UE.

The UE may include a transceiver unit and a control unit controlling the transceiver unit.

When the transceiver unit sends a signal to a base station in an uplink band spaced apart from an uplink band used by UE within an adjacent cell by a specific band so that the uplink band of the transceiver unit is not contiguous to the uplink band used by the UE within the adjacent cell, a value of an Adjacent Channel Interference Ratio (ACIR) of the transceiver unit is limited to a value calculated by an equation below according to an offset k with the specific band, $$ACIR_{new,k} = 10 \cdot \log_{10}\left(10^{-ACIR_k/10} \cdot \frac{BW_{16RB} - BW_{guard}}{BW_{16RB}} + 10^{-ACIR_{k+1}/10} \cdot \frac{BW_{guard}}{BW_{16RB}}\right)$$

Here, the k may be a constant indicating a $k^{th}$ ACLR value, the $BW_{16RB}$ may be a bandwidth corresponding to 16 resource blocks, and the $BW_{guard}$ may be a bandwidth of a guard band.

The UE may be an LTE-A UE or E-UTRA UE, and the UE within the adjacent cell may be an LTE UE, an LTE-A UE, or a UTRA UE.

The specific band may be a guard band, and the specific band may be 1 MHz.

The values calculated by the equation are represented by a table below.

| Frequency offset from the specific band | ACIR value (LTE-A) |
| --- | --- |
| 0 RB | 32 + X (X = ..., −10, −5, 0, . 5, 10, ... dB) |
| 16 RBs | 43 + X (X = ..., −10, −5, 0, . 5, 10, ... dB) |
| 32 RBs or more | 43 + X (X = ..., −10, −5, 0, . 5, 10, ... dB) |

Advantageous Effects

In accordance with the proposal of the present invention, interference between systems is suppressed. In accordance with the disclosure of the present invention, inter-cell interference is suppressed.

DESCRIPTION OF DRAWINGS

FIG. 7 is an exemplary diagram showing that the uplink of a victim system is subject to interference in first and second scenarios in which the bandwidth of an aggressor system and the bandwidth of the victim system are identical with each other.

MODE FOR INVENTION

Figure 1:
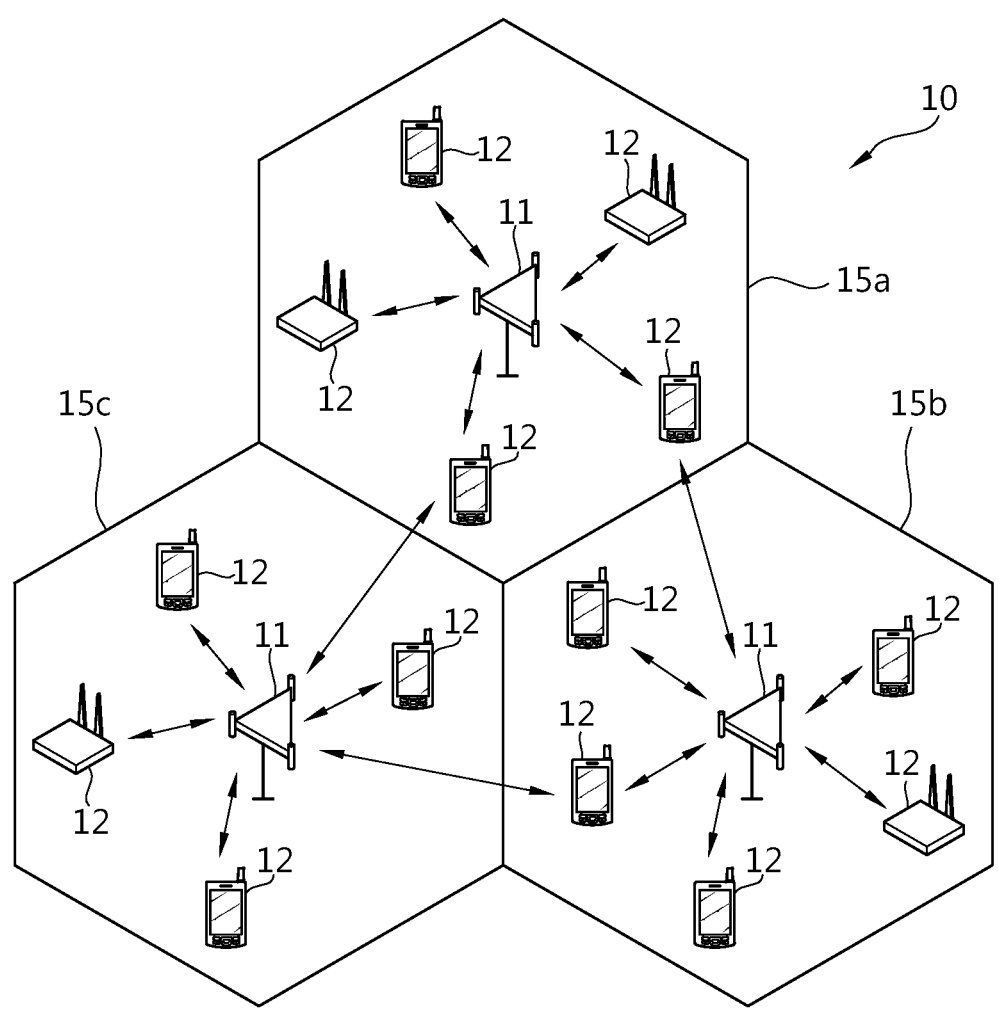
FIG. 1 shows a wireless communication system.
Figure 2:
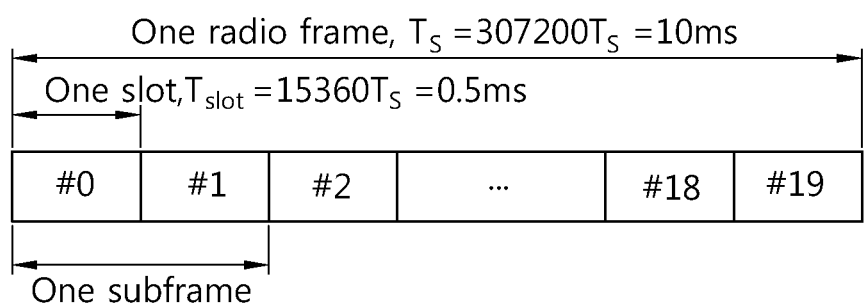
FIG. 2 shows a type 1 radio frame structure.
Figure 3:
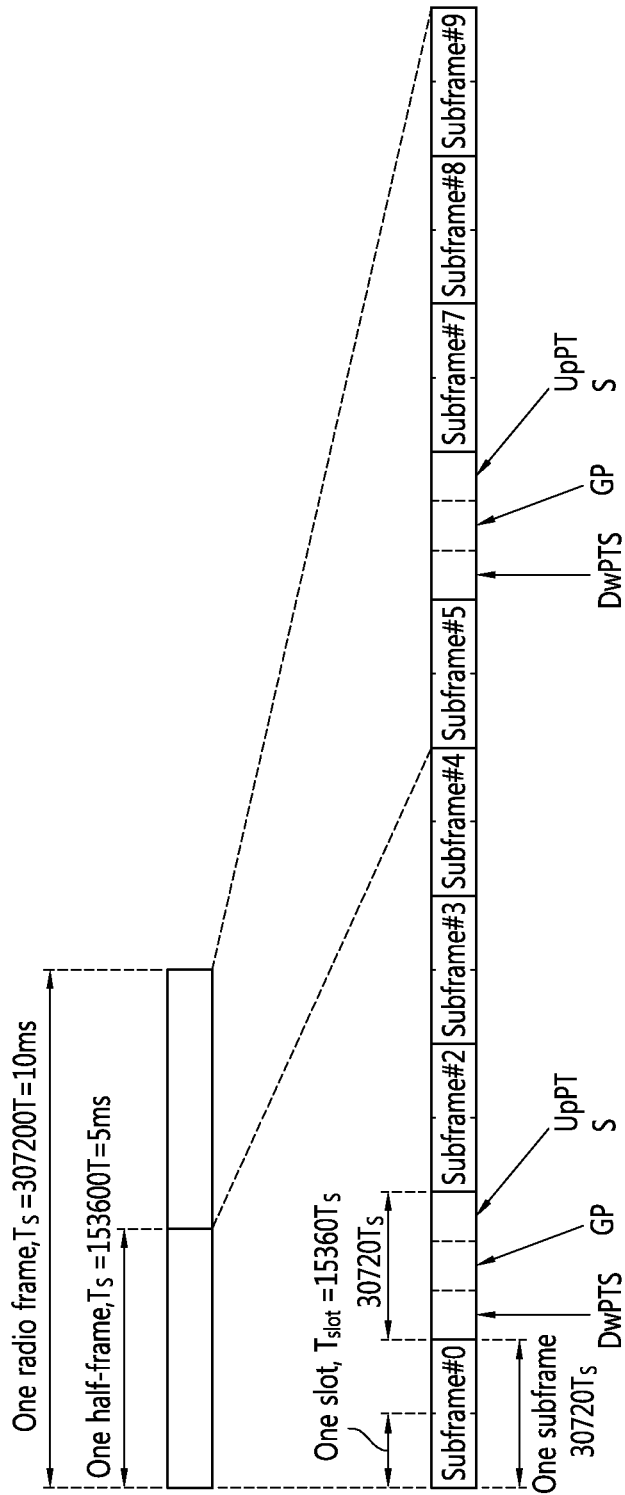
FIG. 3 shows a type 2 radio frame structure.
Figure 4:
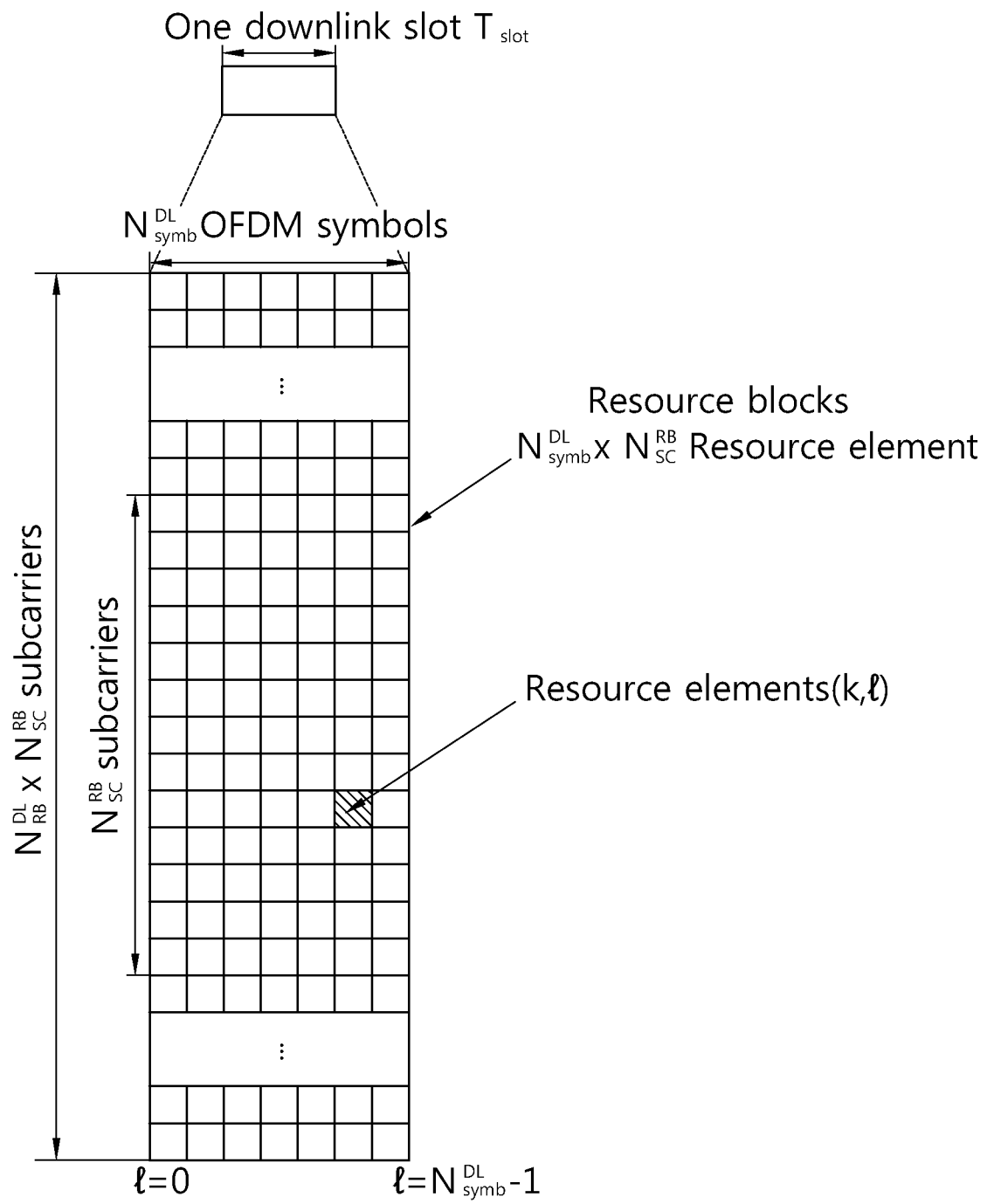
FIG. 4 shows the slot structure of LTE downlink.
Figure 5:
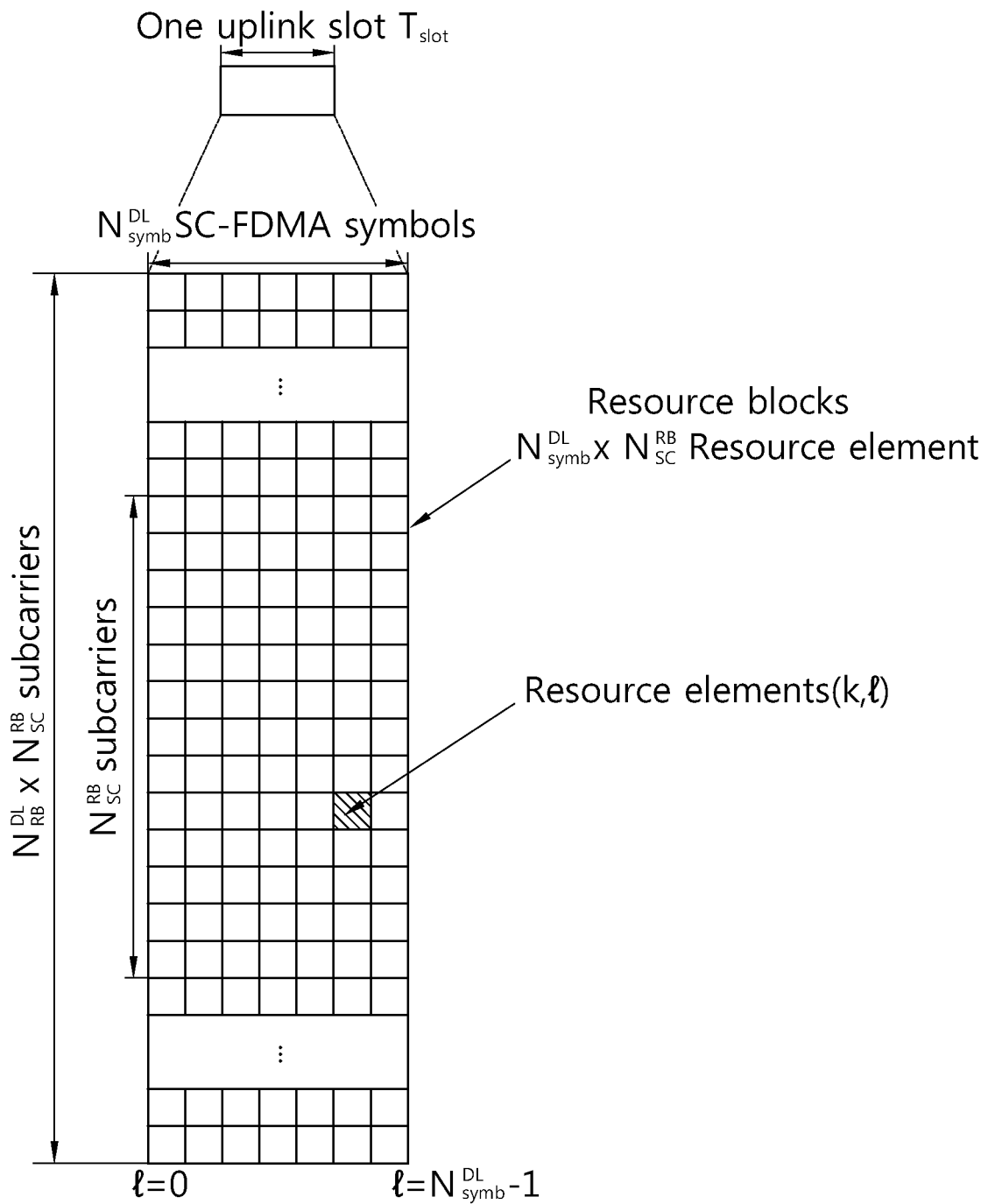
FIG. 5 shows the slot structure of LTE uplink.
Figure 6:
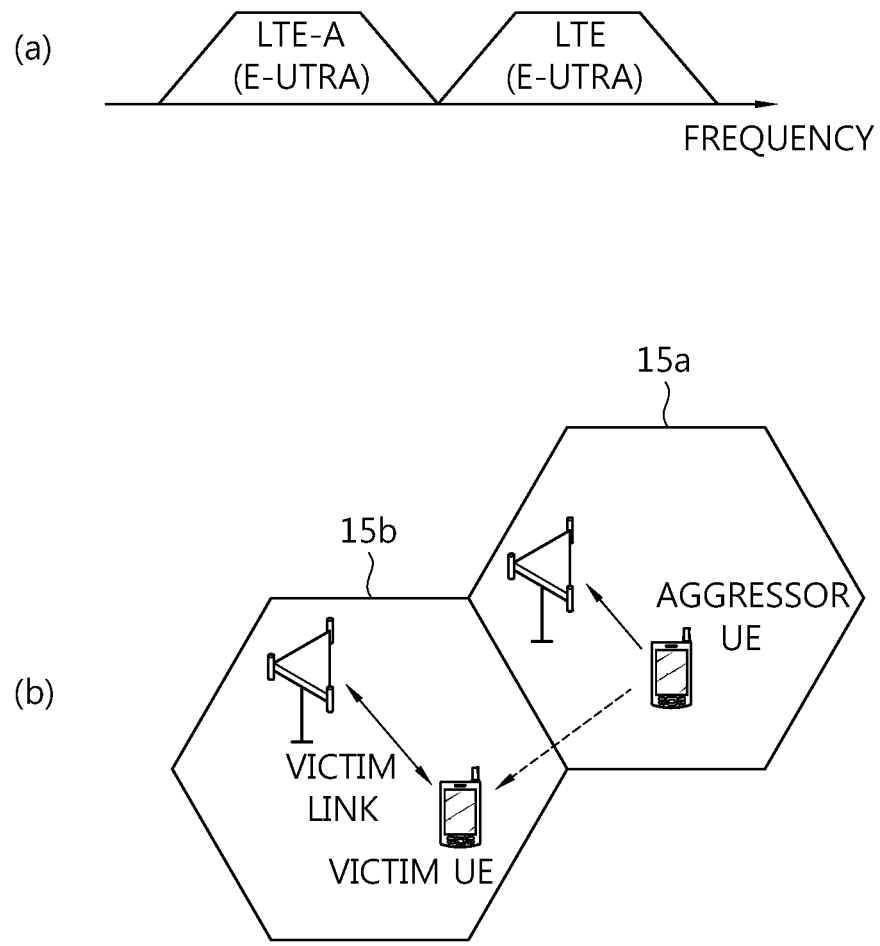
FIG. 6 is a diagram showing an example in which interference between systems occurs.

The present invention is applied to an LTE or LTE-A system. However, the present invention is not limited to the LTE or LTE-A system, but may be applied to all communication systems and methods to which the technical spirit of the present invention may be applied and other systems.

Technical terms used in this specification are used to describe only specific embodiments, and it is to be noted that the terms are not intended to limit the present invention. Furthermore, the technical terms used in this specification should be interpreted as having meanings that are commonly understood by a person having ordinary skill in the art to which the present invention belongs, unless specifically defined in this specification, and should not be interpreted as having excessively comprehensive meanings or excessively reduced meanings. Furthermore, if the technical terms used in this specification are erroneous technical terms that do not precisely represent the spirit of the present invention, they should be replaced with technical terms that may be correctly understood by a person having ordinary skill in the art and understood. Furthermore, common terms used in the present invention should be interpreted according to the definitions of dictionaries or according to the context and should not be interpreted as having excessively reduced meanings.

Furthermore, an expression of the singular number used in this specification includes an expression of the plural number unless clearly defined otherwise in the context. In this application, terms, such as "comprise" or "include", should not be interpreted as essentially including all several elements or several steps described in the specification and should be interpreted as not including some of the elements or steps or as including additional element or steps.

Furthermore, terms including ordinal numbers, such as the first and the second which are used in this specification, may be used to describe a variety of elements, but the elements should not be limited to the terms. The terms are used to only distinguish one element from the other element. For example, a first element may be named a second element and likewise a second element may be named a first element without departing the scope of the present invention.

When it is said that one element is described as being "connected" or "coupled" to the other element, it should be understood that one element may be directly connected or coupled to the other element, but a third element may be interposed between the two elements. In contrast, when it is said that one element is described as being "directly connected" or "directly coupled" to the other element, it should be understood that a third element is not interposed between the two elements.

Hereinafter, preferred embodiments according to the present invention are described in detail with reference to the accompanying drawings. The same or similar elements are assigned the same reference numerals irrespective of reference numerals, and a redundant description thereof is omitted. Furthermore, in describing the present invention, a detailed description of the known functions and constructions will be omitted if it is deemed to make the gist of the present invention unnecessarily vague. Furthermore, the accompanying drawings are provided to help easily understand the spirit of the present invention, and it is to be noted that the spirit of the present invention should not be limited by the spirit of the present invention. The spirit of the present invention should be interpreted as being extended up to all changes, equivalents to substitutes other than the accompanying drawings.

Although User Equipment (UE) is shown, the UE may be called Customer Premise Equipment (CPE), a terminal, Mobile Equipment (ME), a Mobile Station (MS), a User Terminal (UT), a Subscriber Station (SS), a wireless device, a handheld device, or an Access Terminal (AT). Furthermore, the UE may be a portable device equipped with a communication function, such as a mobile phone, a PDA, a smart phone, a wireless modem, or a notebook, or a non-portable device, such as a PC or a device mounted on a vehicle.

FIG. 7 is an exemplary diagram showing that the uplink of a victim system is subject to interference in first and second scenarios in which the bandwidth of an aggressor system and the bandwidth of the victim system are identical with each other.

As can be seen from FIG. 7(a), it was assumed that two systems had the same bandwidth. Here, if the two systems use adjacent bands without a guard band on the frequency axis, when an aggressor system (or a primary system) sends a signal (in other words, when UE or CPE sends a signal), a victim system (or a secondary system) in a adjacent frequency band (in other words, uplink in a adjacent cell) is subject to interference due to unwanted emission. In FIG. 7, it was assumed that the aggressor system was LTE-A UE.

Meanwhile, if the two systems use adjacent bands on the frequency axis, for example, in Table 1 below, the aggressor system uses an operating band 18 for uplink and the victim system may use an operating band 19 for uplink. Or, the two systems may use adjacent operating bands within the operating band 18.

TABLE 1

| Operating band | Uplink operating band | Downlink operating band | Duplex mode |
| --- | --- | --- | --- |
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |

TABLE 1-continued

| Operating band | Uplink operating band | Downlink operating band | Duplex mode |
|---|---|---|---|
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHZ-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | reserved | reserved | FDD |
| 16 | reserved | reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| ... | | | |
| 24 | 1626.5 MHz-1660.5 MHz | 1525 MHz-1559 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz 2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |

As in FIG. 7(b), the transmission of an uplink signal from an aggressor system (i.e., UE or CPE) is unnecessarily emitted to an adjacent channel, so that an adjacent system (i.e., the UE or CPE of an adjacent cell) is influenced by interference.

An Adjacent Channel Interference Ratio, that is, an ACIR, appears. The ACIR is a ratio of total power transmitted by the transmitter (BS or UE) of an aggressor system to interference power that affects the receiver of a victim system. Accordingly, the ACIR may be represented by $P_{aggressor}-P_{victim}$. Here, $P_{aggressor}$ is the transmission power of the aggressor system, and $P_{victim}$ is interference power in the receiver of the victim system.

As shown, the bandwidth of the ACIR is equal to the bandwidth of the aggressor system. A band placed just near the frequency band of the aggressor system is subject to interference that is equal to the value of an ACIR 1. The ACIR is reduced to the value of an ACIR 2 and the value of an ACIR 3 as it gradually becomes far from the aggressor system on the frequency axis. The ACIR 3 is distributed in several bands on the frequency axis.

The ACIR value is shown in Table 1 below.

TABLE 2

| | ACIR value (LTE-A) | ACIR value (LTE) |
|---|---|---|
| ACIR 1 | 30 + X | 30 + X |
| ACIR 2 | 43 + X | 43 + X |
| ACIR 3 | 50 + X | 43 + X |

In Table 1 above, the X is a step size for simulations (e.g., X= ..., −10, −5, 0, 5, 10, ... [dB]).

Meanwhile, in accordance with the first and the second scenarios in which the bandwidth of an aggressor system and the bandwidth of a victim system are identical with each other, the value of an ACIR may be calculated from an uplink ACIR value shown in Table 2 below.

TABLE 3

| Frequency offset of aggressor system (16 RBs) and victim system (16 RBs) | ACIR value (LTE-A) |
|---|---|
| 0 RB | 30 + X |
| 16 RBs | 43 + X |
| 32 RBs or more | 50 + X |

Figure 8:
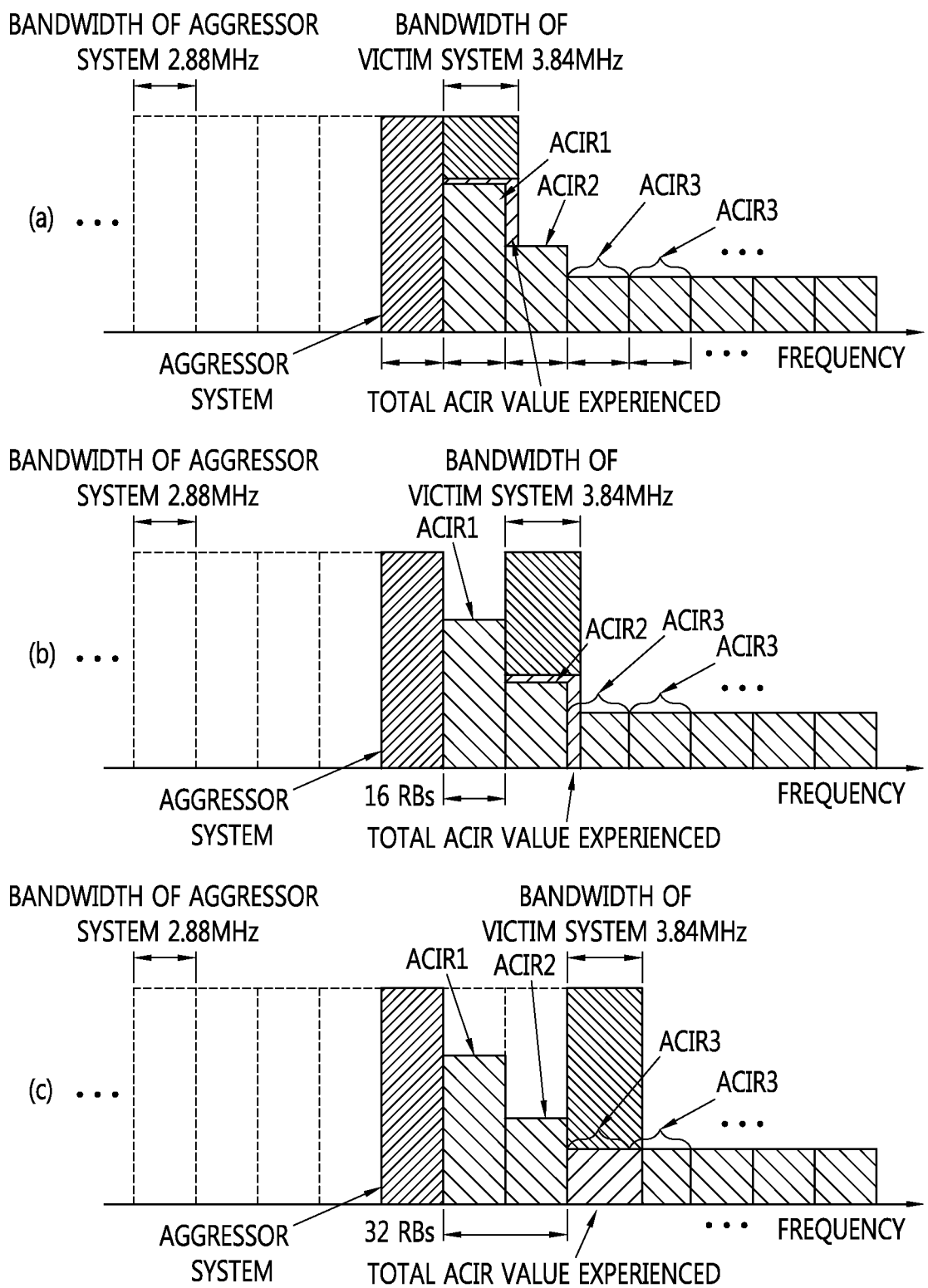
FIG. 8 is an exemplary diagram showing that the uplink of a victim system is subject to interference in a third scenario in which the bandwidth of the victim system is greater than the bandwidth of an aggressor system.

FIG. 8 is an exemplary diagram showing that the uplink of a victim system is subject to interference in a third scenario in which the bandwidth of the victim system is greater than the bandwidth of an aggressor system.

As can be seen from FIGS. 8(a) to 8(c), the bandwidth of a victim system (or a secondary system) is 3.84 MHz and the bandwidth of an aggressor system is 2.88 MHz (2.88 MHz=180 kHz×16 RBs). The victim system is a UTRA system, that is, a WCDMA system.

As can be seen from FIG. 8(a), if the two systems use adjacent bands without a guard band on the frequency axis, the aggressor system (or a primary system) (i.e., UE or CPE) sends an uplink signal, the transmission is unnecessarily emitted to two channels adjacent to each other, and thus the uplink of the adjacent victim system (or the secondary system) (i.e., UE or CPE within a adjacent cell) is influenced by interference. That is, the channel bandwidth of the victim system is influenced by an ACIR1 and an ACIR2.

Furthermore, as can be seen from FIG. 8(b), in the state in which the bandwidth of an aggressor system is spaced apart from the bandwidth of a victim system by 16 RBs (i.e., 2.88 MHz), when the aggressor system sends a signal, the victim system is subject to interference due to an ACIR 2 and an ACIR 3.

Furthermore, as can be seen from FIG. 8(c), in the state in which the bandwidth of an aggressor system is spaced apart from the bandwidth of a victim system by 32 RBs (i.e., 5.76 MHz), when the aggressor system sends a signal, the victim system is subject to interference due to an ACIR 3.

In the above cases, the values of the ACIRs may be summarized as in Table 4 below.

TABLE 4

| Frequency offset of aggressor system (16 RBs) and victim system (16 RBs) | ACIR value (LTE-A) |
|---|---|
| 0 RB | 30 + X |
| 16 RBs | 43 + X |
| 32 RBs or more | 49 + X |

Figure 9:
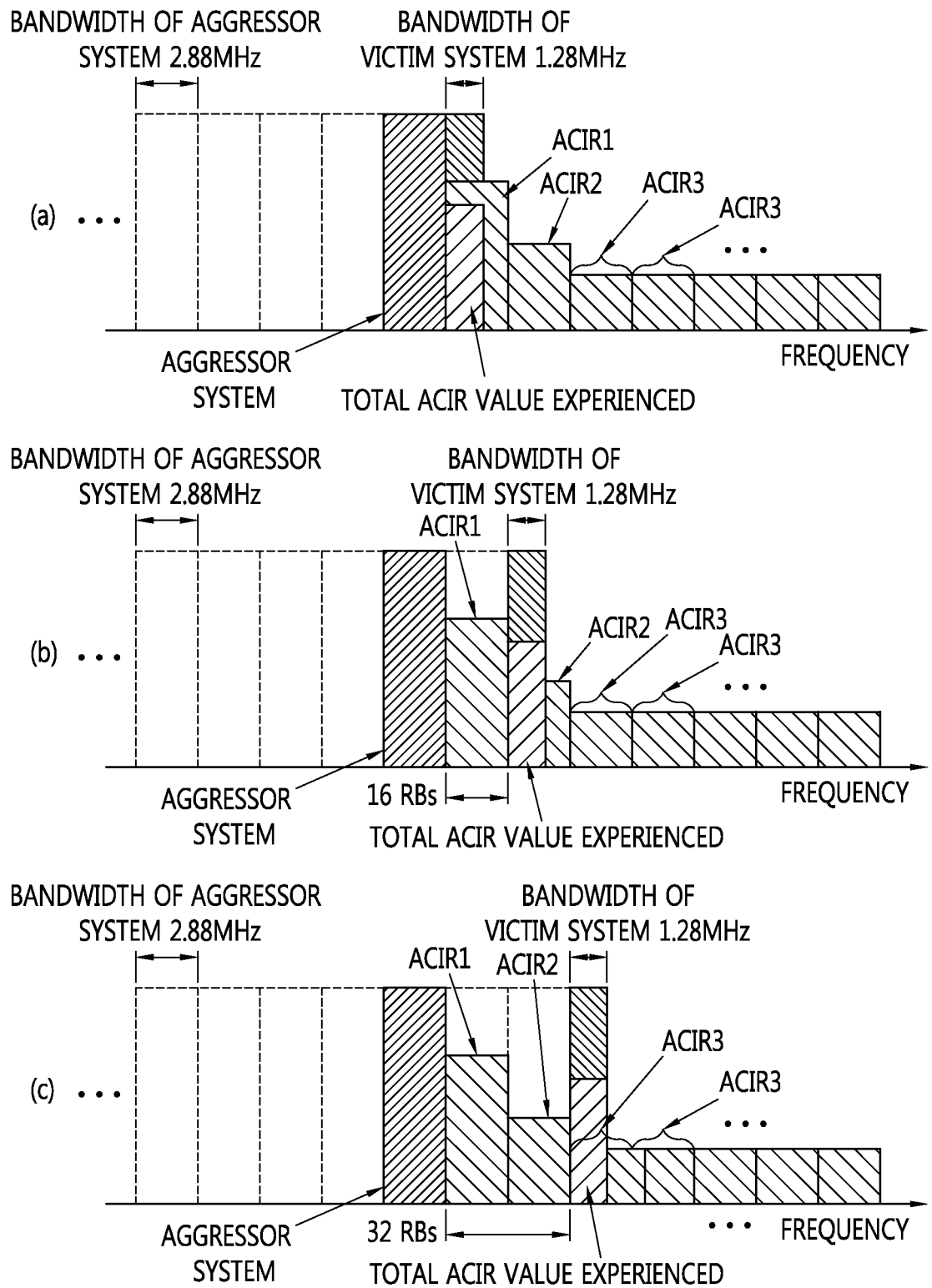
FIG. 9 is an exemplary diagram showing that the uplink of a victim system is subject to interference in a fourth scenario in which the bandwidth of the victim system is smaller than the bandwidth of an aggressor system.

FIG. 9 is an exemplary diagram showing that the uplink of a victim system is subject to interference in a fourth scenario in which the bandwidth of the victim system is smaller than the bandwidth of an aggressor system.

As can be seen from FIGS. 9(a) to 9(c), the bandwidth of a victim system is 1.28 MHz and the bandwidth of an aggressor system is 2.88 MHz (2.88 MHz=180 kHz×16 RBs). The victim system is a UTRA system, that is, a WCDMA system.

First, as can be seen from FIG. 9(a), if two systems use adjacent bands without a guard band on the frequency axis, when the aggressor system (i.e., UE or CPE) sends an uplink signal, the transmission is unnecessarily emitted to two channels adjacent to each other, and thus the uplink of an adjacent system (i.e., UE or CPE within a adjacent cell) is influenced by interference. That is, the channel bandwidth of the victim system is influenced by part of an ACIR1.

Furthermore, as can be seen from FIG. 9(b), in the state in which the bandwidth of an aggressor system is spaced apart from the bandwidth of a victim system by 16 RBs (i.e., 2.88 MHz), when the aggressor system (i.e., UE or CPE) sends an uplink signal, the victim system (i.e., UE or CPE within a adjacent cell) is subject to interference due to part of an ACIR 2.

Furthermore, as can be seen from FIG. 9(c), in the state in which the bandwidth of an aggressor system is spaced apart from the bandwidth of a victim system by 32 RBs (i.e., 5.76 MHz), when the aggressor system sends a signal, the victim system is subject to interference due to part of an ACIR 3.

In the above cases, the values of the ACIRs may be summarized as in Table 5 below.

TABLE 5

| Frequency offset of aggressor system (16 RBs) and victim system (16 RBs) | ACIR value (LTE-A) |
|---|---|
| 0 RB | 33.5 + X |
| 16 RBs | 46.5 + X |
| 32 RBs or more | 53.5 + X |

The scenarios described with reference to FIGS. 7 to 9 are summarized as follows.

TABLE 6

| Scenario | Aggressor system | Victim system |
|---|---|---|
| 1 | DL: 40 MHz, UL: 40 MHz LTE-A | 10 MHz LTE |
| 2 | DL: 40 MHz, UL: 40 MHz LTE-A | DL: 40 MHz, UL: 40 MHz LTE-A |
| 3 | DL: 40 MHz, UL: 40 MHz LTE-A | 5 MHz UTRA FDD |
| 4 | DL: 40 MHz, UL: 40 MHz LTE-A | 1.6 MHz UTRA TDD |

As described above with reference to FIGS. 7 to 9, examples in which the victim system experiences interference when the aggressor system sends a signal in the state in which the aggressor system and the victim system are adjacent to each other on the frequency axis or they are spaced apart from each other by 16 RBs or 32 RBs or more has been described.

In the descriptions given with reference to FIGS. 7 to 9, however, the values of ACIRs were defined when the aggressor system and the victim system are adjacent to each other or spaced apart from each other by 16 RBs or 32 RBs or more on the frequency axis within the same operating band (e.g., the operating band 18) in Table 1. Furthermore, in the descriptions given with reference to FIGS. 7 to 9, ACIR values were defined when there is no guard band between operating bands used by the two systems as in the case where the aggressor system uses the operating band 18 (815 MHz-830 MHz) and the victim system uses the operating band 19 (830 MHz-845 MHz) in Table 1.

If there is a guard band of 1 MHz as in the operating band 13 (777 MHz-787 MHz) and the operating band 14 (788 MHz-798 MHz) of Table 1, however, there is a problem in that it is difficult to apply the above-described ACIR values.

Accordingly, if a guard band exists as described above, there is a need for a new ACIR modeling method in which the guard band is taken into consideration in order to analyze a precise ACIR.

Figure 10:
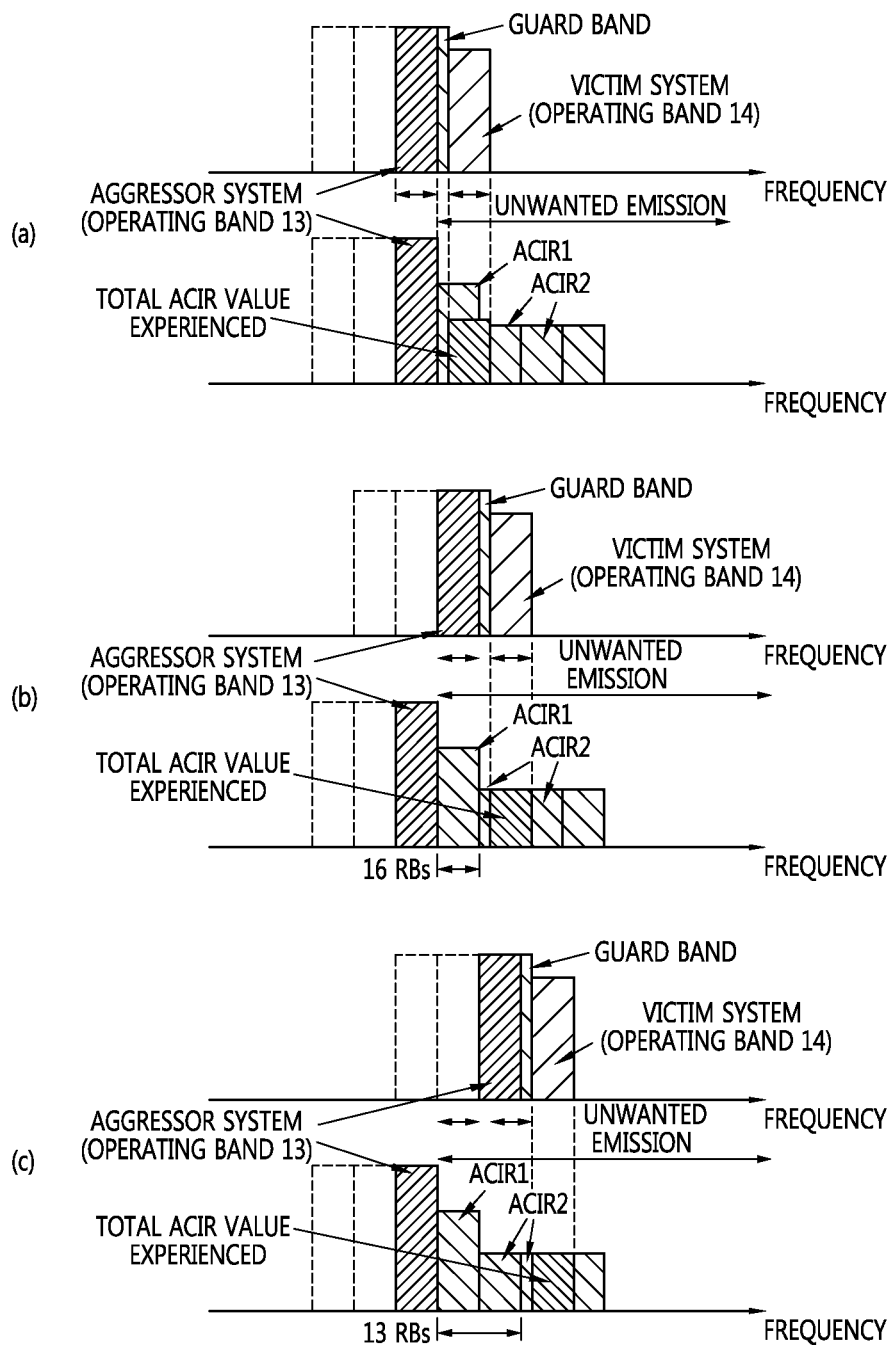
FIG. 10 is an exemplary diagram showing that the uplink of a victim system is subject to interference in a scenario in which there is a guard band between an aggressor system and the victim system.

Accordingly, precise ACIR values when there is a guard band between operating bands used by two systems are proposed with reference to FIG. 10.

FIG. 10 is an exemplary diagram showing that the uplink of a victim system is subject to interference in a scenario in which there is a guard band between an aggressor system and the victim system.

If, as described above, an aggressor system uses the operating band 13 shown in Table 1 and a victim system uses the operating band 14 shown in Table 1, there is a guard band 1 MHz between the operating bands of the aggressor system and the victim system.

This scenario may be represented by Table 7 below.

TABLE 7

| Scenario | Aggressor system (operating band 13) | Victim system (operating band 14) |
|---|---|---|
| 5 | DL: 10 MHz, UL: 10 MHz LTE/CPE | 10 MHz LTE |

Accordingly, it is necessary to calculate new ACIR values.

Although an example in which the guard band 1 MHz exists between the operating band has been illustrated in FIG. 10, the present invention may be applied to not only the case where the guard band 1 MHz exists between the operating bands of two systems, but also the case where the operating bands of two systems are not adjacent to each other by a multiple of an integer of 16 RBs.

First, as can be seen from FIG. 10(a), if an aggressor system (i.e., UE or CPE) uses the operating band 13 shown in Table 1 for uplink and a victim system uses the operating band 14 shown in Table 1 for uplink, there is a guard band 1 MHz between the operating bands of the aggressor system and the victim system.

In this situation, when the aggressor system (i.e., UE or CPE) sends an uplink signal, the uplink of the adjacent victim system (i.e., UE or CPE within a adjacent cell) is influenced by interference because the transmission is unnecessarily emitted to two channels adjacent to each other. That is, the channel bandwidth of the victim system is influenced by part of an ACIR1 and part of an ACIR2. The values of the ACIRs experienced by the adjacent victim system correspond to part of the ACIR 1 and part of the ACIR2, and they are 31.7 dB. This may be represented by Equation 1 below.

$$31.7 = 10 \cdot \log_{10}\left(10^{-ACIR1/10} \cdot \frac{BW_{16RB} - BW_{guard}}{BW_{16RB}} + 10^{-ACIR2/10} \cdot \frac{BW_{guard}}{BW_{16RB}}\right) = $$
$$10 \cdot \log_{10}\left(10^{-3} \cdot \frac{2.88 - 1}{2.88} + 10^{-4.3} \cdot \frac{1}{2.88}\right)$$

[Equation 1]

Meanwhile, as can be seen from FIG. 10(b), in the state in which the bandwidth of an aggressor system is spaced apart from a guard band by 16 RBs (i.e., 2.88 MHz), when an aggressor system (i.e., UE or CPE) sends a signal, the uplink of a victim system (i.e., UE or CPE within an adjacent cell) is subject to interference by an ACIR 2. The value of the ACIR experienced by the adjacent victim system is 43 dB. This may be represented by Equation 2 below.

$$43 = 10 \cdot \log_{10}\left(10^{-ACIR2/10} \cdot \frac{BW_{16RB} - BW_{guard}}{BW_{16RB}} + 10^{-ACIR3/10} \cdot \frac{BW_{guard}}{BW_{16RB}}\right) = $$
$$10 \cdot \log_{10}\left(10^{-4.3} \cdot \frac{2.88 - 1}{2.88} + 10^{-4.3} \cdot \frac{1}{2.88}\right)$$

[Equation 2]

Meanwhile, as can be seen from FIG. 10(c), in the state in which the bandwidth of an aggressor system is spaced apart from a guard band by 32 RBs (i.e., 5.76 MHz), when an aggressor system sends a signal, the victim system is subject to interference by a value of an ACIR 2. The value of the ACIR experienced by the adjacent victim system is 43 dB. This may be represented by Equation 3 below.

$$43 = 10 \cdot \log_{10}\left(10^{-ACIR3/10} \cdot \frac{BW_{16RB} - BW_{guard}}{BW_{16RB}} + 10^{-ACIR3/10} \cdot \frac{BW_{guard}}{BW_{16RB}}\right) = $$
$$10 \cdot \log_{10}\left(10^{-4.3} \cdot \frac{2.88 - 1}{2.88} + 10^{-4.3} \cdot \frac{1}{2.88}\right)$$
[Equation 3]

Equation 1 to Equation 3 may be summarized as in Table below.

TABLE 8

| Frequency offset of aggressor system (16 RBs) and guard band | ACIR value (LTE-A) |
|---|---|
| 0 RB | 32 + X |
| 16 RBs | 43 + X |
| 32 RBs or more | 43 + X |

Meanwhile, Equation 1 to Equation 3 may be generalized into Equation 4.

$$ACIR_{new,k} = 10 \cdot \log_{10}\left(10^{-ACIR_k/10} \cdot \frac{BW_{16RB} - BW_{guard}}{BW_{16RB}} + 10^{-ACIR_{k+1}/10} \cdot \frac{BW_{guard}}{BW_{16RB}}\right)$$
[Equation 4]

In Equation 4, the k is a constant indicating a $k^{th}$ ACIR value, $BW_{16RB}$ is a bandwidth corresponding to 16 RBs, and $BW_{guard}$ is the bandwidth of a guard band.

As described above, an aggressor system (or a primary system) gives influence to an adjacent system by an ACIR. Accordingly, the transmitter of an aggressor system, for example, a terminal or UE (or CPE) needs to be controlled when sending a signal so that the transmitter sends the signal with power less than the values of ACIRs show in Table 8 or power less than the value of an ACIR calculated by Equation 4.

The above-described embodiments and modified examples may be combined. Accordingly, each of the embodiments is not implemented solely, but the embodiments may be implemented in combination at need. The combinations may be easily implemented by a person having ordinary skill in the art who reads this specification, and thus a detailed description thereof is omitted. It is however to be noted that although the combinations are not described, they are not excluded from the present invention, but should be interpreted as being included in the scope of the present invention.

The above-described embodiments and modified examples may be implemented through a variety of means. For example, the embodiments of the present invention may be implemented by hardware, firmware, software, or a combination of them.

In the case of implementations using hardware, a method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro controllers, micro processors, etc.

In the case of implementations using firmware or software, a method according to the embodiments of the present invention may be implemented in the form of a module, a procedure, or function that performs the above-described functions or operations. A software code may be stored in a memory unit and driven by a processor. The memory unit may be placed inside or outside the processor, and it may exchange data with the processor through a variety of known means.

For example, the methods in accordance with the present invention may be stored in a storage medium (e.g., internal memory, flash memory, or a hard disk) and may be implemented using codes or instructions within a software program that may be executed by a processor (e.g., a micro processor). This is described below with reference to FIG. 11.

Figure 11:
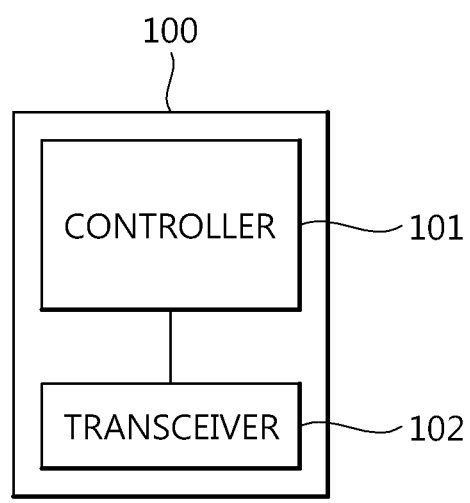
FIG. 11 is a block diagram showing the construction of UE 100 in accordance with the present invention.

FIG. 11 is a block diagram showing the construction of UE 100 in accordance with the present invention.

As shown in FIG. 11, the UE 100 includes a controller 101 and a transceiver unit 102.

The controller 101 controls the transceiver unit 102. More particularly, the controller 101 performs control when the transceiver unit 102 sends a signal so that the transceiver unit 102 sends the signal with power less than the values of ACIRs shown in Table 8 or power less than the value of an ACIR calculated by Equation 4.

The above-described embodiments are results in which the elements and characteristics of the present invention are combined in a specific form. Each of the element or characteristics has to be considered as being optional unless otherwise explicitly described. Each of the elements or characteristics may be implemented in such a way as not to be combined with other elements or characteristics. Furthermore, some of the elements and/or the characteristics may be combined to form an embodiment of the present invention. Order of the operations described in the embodiments of the present invention may be changed. Some of the elements or characteristics of one embodiment may be included in the other embodiment or may be replaced with elements or characteristics corresponding to the other embodiment. It is evident that in the claims, embodiments may be constructed by combining claims not having an explicit citation relation or the claims not having an explicit citation relation may be included in a new claim according to amendments after an application.

The present invention may be materialized in a specific form without departing from the spirit and essential characteristics of the present invention. Accordingly, the detailed description should not be interpreted as being limited from all aspects, but should be considered as being illustrative. The scope of the present invention should be determined by reasonable analysis of the attached claims, and all changes within an equivalent range of the present invention fall within the scope of the present invention. Furthermore, in the claims, embodiments may be constructed by combining claims not having an explicit citation relation or the claims not having an explicit citation relation may be included in a new claim according to amendments after an application.

The invention claimed is:

1. A user equipment (UE), comprising:
   a transceiver; and
   a controller configured to control the transceiver,
   wherein when the transceiver sends a signal to a base station in an uplink band spaced apart from an uplink band used by the UE within an adjacent cell by a specific band so that the uplink band of the transceiver is not contiguous to the uplink band used by the UE within the adjacent cell, a value of an Adjacent Channel Interference Ratio (ACIR) of the transceiver is limited to values calculated by an equation below according to an offset k with the specific band, $$ACIR_{new,k} = 10 \cdot \log_{10}\left(10^{-ACIR_k/10} \cdot \frac{BW_{16RB} - BW_{guard}}{BW_{16RB}} + 10^{-ACIR_{k+1}/10} \cdot \frac{BW_{guard}}{BW_{16RB}}\right)$$

wherein k is a constant indicating a kth ACIR value, $BW_{16RB}$ is a bandwidth corresponding to 16 resource blocks (RBs), and $BW_{guard}$ is a bandwidth of a guard band.

2. The UE of claim 1, wherein:
the UE is an advanced long term evolution (LTE-A) UE or an evolved universal terrestrial radio access (E-UTRA), and
the UE within the adjacent cell is an LTE UE, an LTE-A UE, or a UTRA UE.

3. The UE of claim 1, wherein the specific band is a guard band.

4. The UE of claim 1, wherein the specific band is 1 MHz.

5. The UE of claim 1, wherein:
the uplink band on which the signal is transmitted is a band within 777 MHz to 787 MHz, and
the uplink band used by the UE within the adjacent cell is a band within 788 MHz to 798 MHz.

* * * * *